(12) United States Patent
Sun

(10) Patent No.: US 11,225,277 B1
(45) Date of Patent: Jan. 18, 2022

(54) DOUBLE-CROSS CART

(71) Applicant: Benlong Sun, Jinhua (CN)

(72) Inventor: Benlong Sun, Jinhua (CN)

(73) Assignee: ZHEJIANG PRIDE LEISURE PRODUCTS CO., LTD., Zhejiang Province (CN)

( * ) Notice: Subject to any disclaimer, the term of this patent is extended or adjusted under 35 U.S.C. 154(b) by 0 days.

(21) Appl. No.: 17/160,411

(22) Filed: Jan. 28, 2021

(30) Foreign Application Priority Data

Jan. 11, 2021 (CN) .............................. 2021006273.4

(51) Int. Cl.
*B62B 3/02* (2006.01)
*B62B 3/00* (2006.01)

(52) U.S. Cl.
CPC .............. *B62B 3/025* (2013.01); *B62B 3/002* (2013.01); *B62B 2205/06* (2013.01)

(58) Field of Classification Search
CPC ......... B62B 3/002; B62B 3/025; B62B 3/007; B62B 2205/06
See application file for complete search history.

(56) References Cited

U.S. PATENT DOCUMENTS

| | | | | |
|---|---|---|---|---|
| 1,539,986 A * | 6/1925 | Beatty | ...................... | B62B 1/00 280/35 |
| 1,771,836 A * | 7/1930 | Beckham | .................. | B62B 3/02 280/640 |
| 1,919,103 A * | 7/1933 | Dolge | ....................... | B62B 3/02 280/640 |
| 2,016,232 A * | 10/1935 | Floyd | ....................... | B62B 3/02 280/640 |
| 2,020,766 A * | 11/1935 | Brown | ...................... | B62B 3/02 280/639 |
| 2,049,683 A * | 8/1936 | Baumgardner | ........... | B62B 3/02 280/640 |
| 8,011,686 B2 * | 9/2011 | Chen | ....................... | B62B 3/106 280/651 |
| 9,056,621 B1 * | 6/2015 | Jin | ........................ | B62B 5/0013 |
| 9,073,564 B2 * | 7/2015 | Yang | ....................... | B62B 3/001 |
| 9,101,206 B1 * | 8/2015 | Chen | ..................... | B62B 5/0013 |
| 9,440,668 B1 * | 9/2016 | Chen | ......................... | B62B 3/02 |
| 9,580,095 B2 * | 2/2017 | Vargas, II | ............... | B62B 3/007 |
| 9,623,890 B1 * | 4/2017 | Horowitz | ................ | B62B 3/005 |
| 9,738,298 B1 * | 8/2017 | Yang | ....................... | B62B 5/0003 |
| 9,855,962 B1 * | 1/2018 | Chen | ....................... | B62B 5/067 |
| 9,950,727 B1 * | 4/2018 | Pang | ....................... | B62B 3/007 |
| 9,950,729 B2 * | 4/2018 | Choi | ........................ | B62B 9/203 |
| 10,099,711 B1 * | 10/2018 | Sun | .......................... | B62B 3/025 |
| 10,106,186 B2 * | 10/2018 | Choi | ......................... | B62B 3/02 |

(Continued)

*Primary Examiner* — Katy M Ebner
(74) *Attorney, Agent, or Firm* — WPAT Law, P.C.; Anthony King

(57) ABSTRACT

A double-cross cart comprises two side wall assemblies, a front wall assembly, a rear wall assembly, a bottom frame assembly, a draw bar assembly and four wheels. A front end and a rear end of the bottom frame assembly are rotatably connected to a lower end of the front wall assembly and a lower end of the rear wall assembly, respectively. The draw bar assembly is rotatably connected to the rear wall assembly. The four wheels are arranged at the lower end of the front wall assembly and the lower end of the rear wall assembly. Each side wall assembly is a double-cross structure composed of two X-shaped connecting rods that are hinged together.

14 Claims, 3 Drawing Sheets

(56) References Cited

U.S. PATENT DOCUMENTS

| | | | |
|---|---|---|---|
| 10,272,937 B2* | 4/2019 | Chen | B62B 5/0003 |
| 10,399,586 B1* | 9/2019 | Huang | B62B 3/003 |
| 10,525,894 B1* | 1/2020 | Williamson | B60R 9/04 |
| 10,562,556 B1* | 2/2020 | Horowitz | B62B 3/007 |
| 10,633,010 B1* | 4/2020 | Zhang | B62B 3/025 |
| 10,836,418 B2* | 11/2020 | Zhu | B62B 3/007 |
| 10,953,903 B1* | 3/2021 | Park | B62B 3/02 |
| 10,953,904 B1* | 3/2021 | Sun | B62B 3/025 |
| 2011/0204598 A1* | 8/2011 | Stevenson | B62B 3/007 |
| | | | 280/639 |
| 2015/0145224 A1* | 5/2015 | Zhu | B62B 3/007 |
| | | | 280/42 |
| 2017/0066463 A1* | 3/2017 | Wang | B62B 3/02 |
| 2017/0259838 A1* | 9/2017 | Choi | B62B 5/064 |
| 2018/0327011 A1* | 11/2018 | Horowitz | B62B 5/065 |
| 2020/0283046 A1* | 9/2020 | Wu | B62B 3/007 |
| 2021/0039696 A1* | 2/2021 | Tong | B62B 3/02 |
| 2021/0086812 A1* | 3/2021 | Park | B62B 3/02 |

* cited by examiner

DOUBLE-CROSS CART

BACKGROUND OF THE INVENTION

1. Technical Field

The invention belongs to the technical field of carts, and particularly relates to a double-cross cart.

2. Description of Related Art

In daily life, carts are generally used by people to transfer articles conveniently. The carts, as transfer vehicles pushed and pulled manually, are low in manufacturing cost, easy to maintain, convenient to operate and light in weight, thus being used to transfer light articles within a short distance extremely conveniently in places where motor vehicles are inapplicable. Most traditional carts are composed of a carrying platform, a handle and wheels, wherein the handle is fixedly mounted at the rear end of the carrying platform, and the wheels are fixedly mounted at the bottom of the carrying platform. To facilitate transport, the carrying platform is generally composed of multiple foldable tubes. However, when the carrying platform is folded, only two ends of each tube are movably connected to other tubes, the tubes may come loose and be separated from one another after being folded, and thus, the space occupied by the carrying platform in the folded state is enlarged; in addition, goods are directly placed on the carrying platform and may be wetted by rain and be affected with damp in adverse weathers such as rainy days; and the handle is generally arranged on a single side of the carrying platform, so it is very strenuous to transfer heavy articles.

BRIEF SUMMARY OF THE INVENTION

The objective of the invention is to overcome the defects of the prior art by providing a double-cross cart.

To fulfill the aforesaid objective, the technical solution adopted by the invention is as follows: a double-cross cart comprises two side wall assemblies, a front wall assembly, a rear wall assembly, a bottom frame assembly, a draw bar assembly and four wheels, wherein the front end and the rear end of the bottom frame assembly are rotatably connected to the lower end of the front wall assembly and the lower end of the rear wall assembly respectively, the draw bar assembly is rotatably connected to the rear wall assembly, and the four wheels are arranged at the lower end of the front wall assembly and the rear end of the rear wall assembly; each side wall assembly is a double-cross structure composed of two X-shaped connecting rods that are hinged together, upper sides of front ends and rear ends of the side wall assemblies are riveted to the front wall assembly and the rear wall assembly respectively, and lower sides of the front ends and the rear ends of the side wall assemblies are riveted to the front end and the rear end of the bottom frame assembly respectively; and a lock part is arranged on each of the two riveted cross tubes of each of the two X-shaped connecting rods on any one side wall assembly, and in a folded state, the two parts are connected to lock the tow cross tubes.

Further, the two lock parts are disposed around the two riveted cross tubes of each of the two X-shaped connecting rods, one lock part is provided with a buckle protrusion, the other lock part is provided with a buckle groove, and in the folded state, the buckle protrusion is embedded in the buckle groove to be locked.

Further, the front wall assembly and the rear wall assembly are identical in structure, and the front wall assembly or the rear wall assembly comprises a lower horizontal tube; the draw bar assembly comprises a draw bar, a first connector and a second connector which are riveted in sequence, a rivet angle between the draw bar and the first connector is different from a rivet angle between the first connector and the second connector, and the second connector is mounted on the lower horizontal tube of the rear wall assembly.

More further, the draw bar and the first connector are riveted in an axial direction of the lower horizontal tube, and the first connector and the second connector are riveted in a radial direction of the lower horizontal tube.

More further, the front wall assembly or the rear wall assembly further comprises an upper U-tube and two vertical tubes, wherein two ends of the upper U-tube are hinged to upper ends of the crossed tubes of the two side wall assemblies and are riveted to upper ends of the two vertical tubes of the front wall assembly or the rear wall assembly, and lower ends of the two vertical tubes are connected to two ends of the lower horizontal tube.

More further, the double-cross cart further comprises a handrail having two ends respectively hinged to upper ends of the two vertical tubes of the front wall assembly. The double-cross cart can be pushed or pulled more easily through the handrail or the draw bar by multiple people.

More further, the double-cross cart further comprises two short tubes which are respectively mounted at the upper ends of the two vertical tubes of the front wall assembly, and the two ends of the handrail are hinged to upper ends of the two short tubes respectively.

More further, the double-cross cart further comprises a roof fabric and support rods, wherein the support rods are mounted on the connectors at the upper ends of the vertical tubes of the front wall assembly and the rear wall assembly, and the roof fabric is mounted at upper ends of the support rods.

More further, the double-cross cart further comprises roof sliders disposed around the vertical tubes of the front wall assembly, and the support rods are mounted on the roof sliders.

More further, the bottom frame assembly comprises two bottom frames and two bottom frame connectors, one sides of the two bottom frames are riveted through the bottom frame connectors, and the other sides of the two bottom frames are riveted to the lower end of the front wall assembly and the lower end of the rear wall assembly, respectively; or, the double-cross car further comprises a cart fabric mounted in a frame formed by the front wall assembly, the rear wall assembly, the two side wall assemblies and the bottom frame assembly.

By adoption of the technical solution, the invention has the following beneficial effects: the double-cross cart can be folded to be stored, thus occupying less space when not used, and after being folded, the double-cross cart can be firmly locked by the lock parts to be maintained in the folded state; the draw bar can be adjusted forwards, backwards, leftwards or rightward by any angle; the roof sliders are disposed around the vertical tubes, so that the height of the roof fabric can be adjusted; and the double-cross cart can be folded, unfolded and used more conveniently and reliably.

In the figures: 1, side wall assembly; 11, cross tube; 12, lock part; 2, front wall assembly; 3, rear wall assembly; 4, bottom frame assembly; 41, bottom frame; 42, bottom frame connector; 5, draw bar assembly; 51, draw bar; 52, first connector; 53, second connector; 6, wheel; 61, wheel carrier; 7, cart fabric; 8, roof fabric; 81, support rod; 82, roof slider; 9, lower horizontal tube; 91, upper U-tube; 82, vertical tube; 10, handrail; 101, short tube; 102, handrail connector; 1021, sleeve.

DETAILED DESCRIPTION OF THE INVENTION

To gain a better understanding of the technical solutions of the invention, specific solutions and embodiments of the invention will be further expounded in conjunction with the accompanying drawings.

Figure 1:
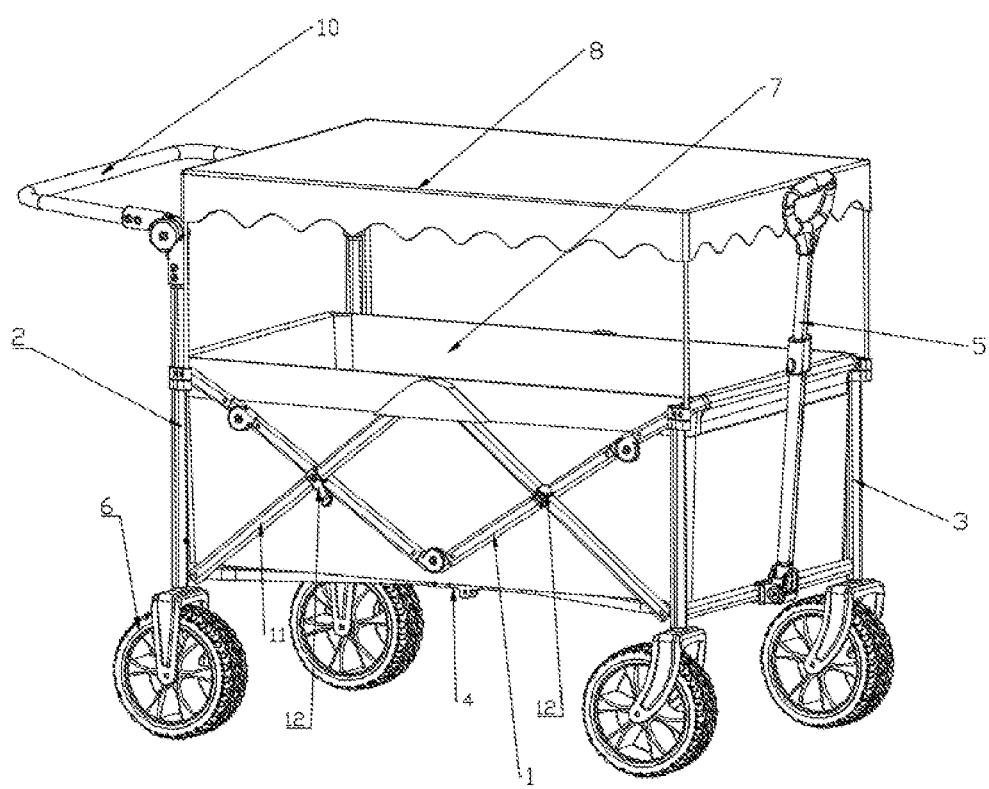
FIG. 1 is a structural diagram of a double-cross cart.
Figure 2:
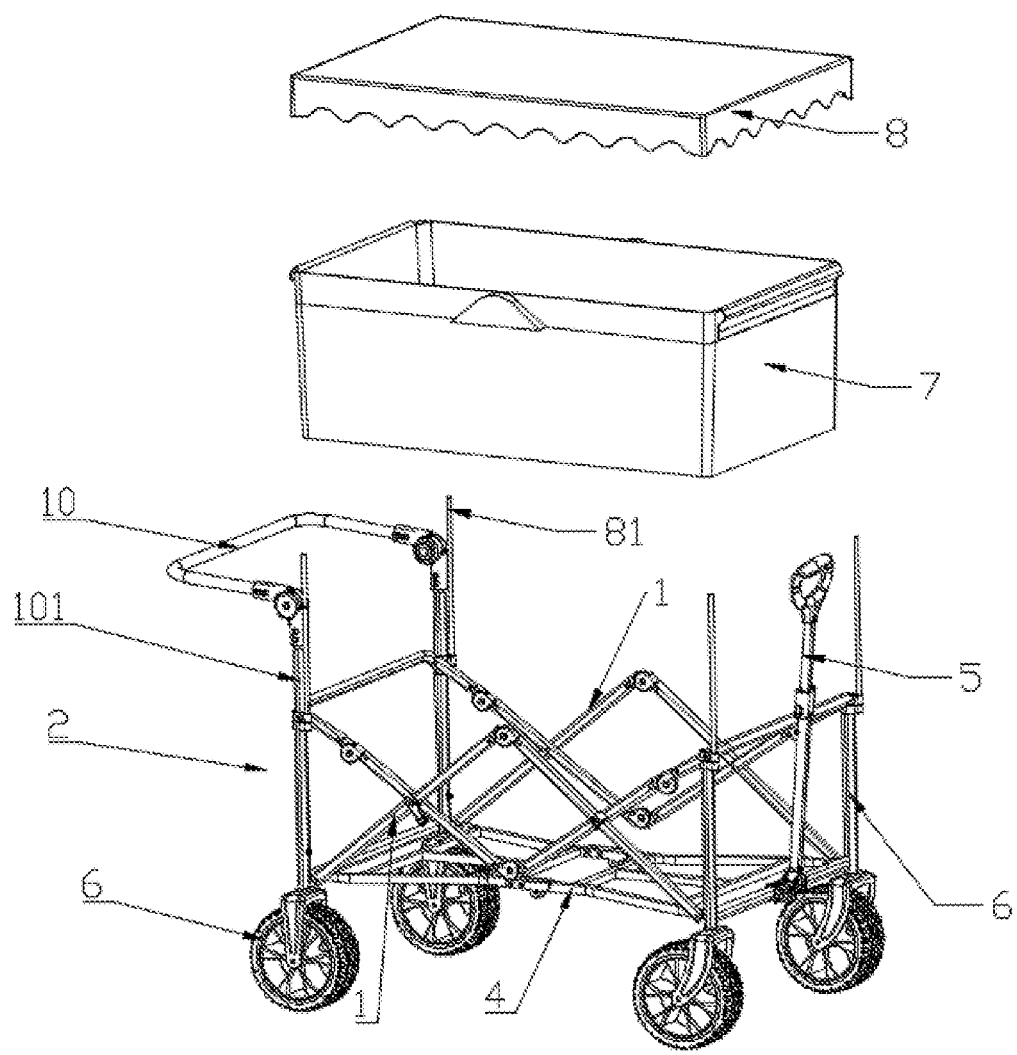
FIG. 2 is a disassembled diagram of the double-cross cart.
Figure 3:
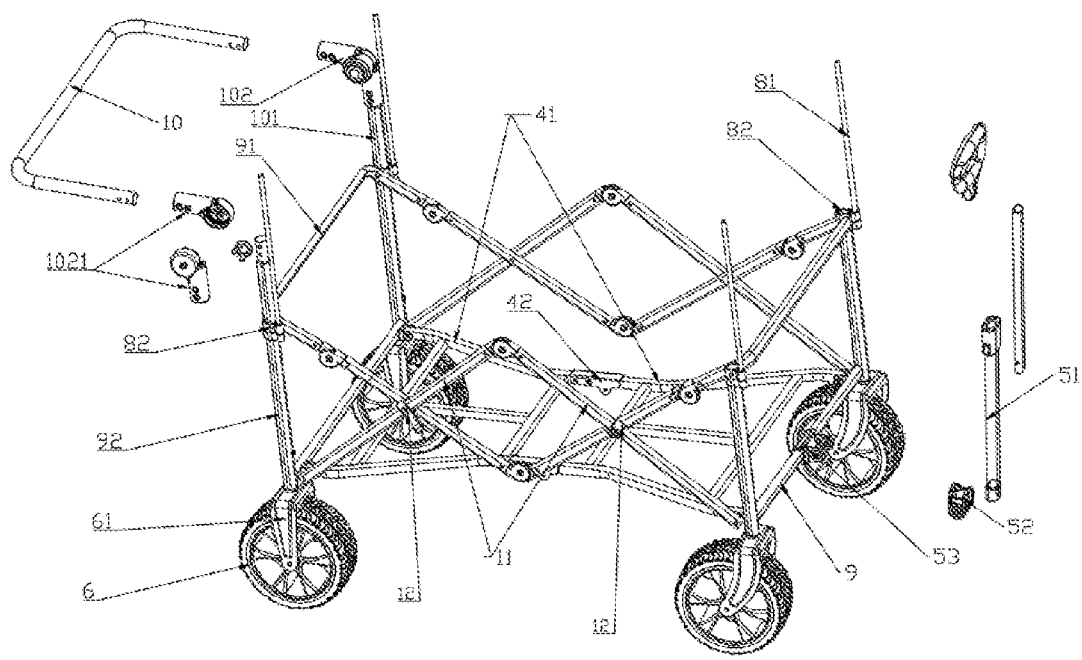
FIG. 3 is a disassembled diagram of a cart frame assembly.

As shown in FIG. 1-FIG. 3, this embodiment discloses a double-cross cart which comprises a cart frame assembly, a cart fabric 7 and a roof fabric 8, wherein the cart frame assembly comprises two side wall assemblies 1, a front wall assembly 2, a rear wall assembly 3, a bottom frame assembly 4, a draw bar assembly 5 and four wheels 6, and the cart fabric 7 is mounted in a frame formed by the front wall assembly, the rear wall assembly, the two side wall assemblies and the bottom frame assembly.

The front end and the rear end of the bottom frame assembly 4 are rotatably connected to the lower end of the front wall assembly 2 and the lower end of the rear wall assembly 3 respectively, the draw bar assembly 5 is rotatably connected to the rear wall assembly 3, and the four wheels 6 are arranged at the lower end of the front wall assembly 2 and the lower end of the rear wall assembly 3.

In this embodiment, each side wall assembly 1 is a double-cross structure formed by two X-shaped connecting rods that are hinged together, wherein each X-shaped connecting rod is composed of two cross tubes 11 that are riveted together, upper sides of the front end and the rear end of the side wall assembly 1 are riveted to the front wall assembly 2 and the rear wall assembly 3 respectively, and lower sides of the front end and the rear end of the side wall assembly 1 are riveted to the front end and rear end of the bottom frame assembly 4 respectively; and a lock part 12 is arranged on each of the two riveted cross tubes 11 of each of the two X-shaped connecting rods on any one of the side wall assemblies 1, and in a folded state, the two lock parts are connected to lock the two cross tubes.

Preferably, in this embodiment, the two lock parts 12 are respectively disposed around the two riveted cross tubes 11 of each of the two X-shaped connecting rods, wherein one lock part is provided with a buckle protrusion, the other lock part is provided with a buckle groove, and in the folded state, the buckle protrusion is embedded in the buckle groove to be locked.

In this embodiment, the front wall assembly 2 and the rear wall assembly 3 are identical in structure; the front wall assembly 2 or the rear wall assembly 3 comprises a lower horizontal tube 9, an upper U-tube 91 and two vertical tubes 92, wherein two ends of the upper U-tube 91 are hinged to upper ends of the cross tubes 11 of the two side wall assemblies respectively and are riveted to upper ends of the two vertical tubes 92 of the front wall assembly or the rear wall assembly respectively, and lower ends of the two vertical tubes 92 are fixedly connected to two ends of the lower horizontal tube 9, respectively.

In this embodiment, the draw bar assembly 5 comprises a draw bar 51, a first connector 52 and a second connector 53, wherein the draw bar 51, the first connector 52 and the second connector 53 are riveted in sequence, a rivet angle between the draw bar 51 and the first connector 52 is different from a rivet angle between the first connector 52 and the second connector 53, and the second connector 53 is disposed around the lower horizontal tube of the rear wall assembly.

Preferably, the draw bar 51 and the first connector 52 are riveted in an axial direction of the lower horizontal tube 9, and the first connector 52 and the second connector 53 are riveted in a radial direction of the lower horizontal tube 9. In this way, the draw bar 51 can be adjusted leftwards or rightwards, with respect to the first connector 52, towards the side wall assemblies, and an integrity formed by the draw bar 51 and the first connector 52 can be adjusted forwards or backwards, with respect to the second connector 53, towards the side wall assemblies and the rear wall assembly. In this embodiment, the draw bar 51 is a telescopic loop bar, and a handle to be held by users is arranged at the top of the loop bar.

In a specific implementation, the double-cross cart further comprises a handrail 10, wherein two ends of the handrail 10 are hinged to upper ends of the two vertical tubes 92 of the front wall assembly 2.

Preferably, each of the two ends of the handrail 10 is hinged to the upper end of a short tube 101, and lower ends of the two short tubes 101 are mounted at the upper ends of the two vertical tubes 92 of the front wall assembly 2, respectively. The handrail 10 is hinged to the upper ends of the short tubes 101 through handrail connectors 102. Specifically, each handrail connector is composed of two sleeves 1021, front ends of which are riveted together. The handrail 10 and the upper end of each short tube 101 are inserted into the two sleeves, respectively.

In a specific implementation, the roof fabric 8 in this embodiment is assembled on the car frame assembly through support rods 81 and roof sliders 82. The support rods 81 are mounted on the connectors at the upper ends of the vertical tubes of the front wall assembly and the rear wall assembly, and the roof fabric is mounted at upper ends of the support rods 81. The roof sliders 82 are disposed around the vertical tubes 92 of the front wall assembly 2, and the support rods 81 are mounted on the roof sliders 82.

In this embodiment, the bottom frame assembly 4 comprises two bottom frames 41 and two bottom frame connectors 42, wherein one sides of the two bottom frames 41 are riveted through the bottom frame connectors 42, and the other sides of the two bottom frames 41 are riveted to the lower end of the front wall assembly 2 and the lower end of the rear wall assembly 3, specifically the lower horizontal tube of the front wall assembly 2 and the lower horizontal tube of the rear wall assembly 3. A U-shaped connector is arranged on each lower horizontal tube, and the other sides of the bottom frames 41 are riveted to the U-shaped connectors.

The wheels 6 are riveted to lower ends of wheel carriers 61, and upper ends of the wheel carriers 61 are inserted into the vertical tubes 92.

It should be noted that the above description is merely used to explain preferred embodiments and technical principles of the invention. Those skilled in the art would appreciate that the invention is not limited to these specific embodiments mentioned above, and can make different obvious variation, readjustment and substitutions without departing from the protection scope of the invention. So, although the invention has been explained in detail with reference to the aforesaid embodiments, the invention is not limited to these embodiments and can include more other equivalent embodiments obtained without departing from the concept of the invention, and the scope of the invention should be defined by the appended claims.

What is claimed is:

1. A double-cross cart, comprising two side wall assemblies, a front wall assembly, a rear wall assembly, a bottom frame assembly, a draw bar assembly and four wheels, wherein a front end and a rear end of the bottom frame assembly are rotatably connected to a lower end of the front wall assembly and a lower end of the rear wall assembly respectively, the draw bar assembly is rotatably connected to the rear wall assembly, and the four wheels are arranged at the lower end of the front wall assembly and the rear end of the rear wall assembly; each said side wall assembly is a double-cross structure composed of two X-shaped connecting rods that are hinged together, upper sides of front ends and rear ends of the side wall assemblies are riveted to the front wall assembly and the rear wall assembly respectively, and lower sides of the front ends and the rear ends of the side wall assemblies are riveted to the front end and the rear end of the bottom frame assembly respectively; and a lock part is arranged on each of two riveted cross tubes of each of the two X-shaped connecting rods on any one said side wall assembly, and in a folded state, the two lock parts are connected to lock the two cross tubes; wherein the front wall assembly and the rear wall assembly are identical in structure, and the front wall assembly or the rear wall assembly comprises a lower horizontal tube; the draw bar assembly comprises a draw bar, a first connector and a second connector which are riveted in sequence, a rivet angle between the draw bar and the first connector is different from a rivet angle between the first connector and the second connector, and the second connector is mounted on the lower horizontal tube of the rear wall assembly.

2. The double-cross cart according to claim 1, wherein the draw bar and the first connector are riveted in an axial direction of the lower horizontal tube, and the first connector and the second connector are riveted in a radial direction of the lower horizontal tube.

3. The double-cross cart according to claim 1, wherein the front wall assembly or the rear wall assembly further comprises an upper U-tube and two vertical tubes, two ends of the upper U-tube are hinged to upper ends of the crossed tubes of the two side wall assemblies and are riveted to upper ends of the two vertical tubes of the front wall assembly or the rear wall assembly, and lower ends of the two vertical tubes are connected to two ends of the lower horizontal tube.

4. The double-cross cart according to claim 3, further comprising a handrail having two ends respectively hinged to the upper ends of the two vertical tubes of the front wall assembly.

5. The double-cross cart according to claim 4, further comprising two short tubes which are respectively mounted at the upper ends of the two vertical tubes of the front wall assembly, and the two ends of the handrail are hinged to upper ends of the two short tubes respectively.

6. The double-cross cart according to claim 3, further comprising a roof fabric and support rods, wherein the support rods are mounted on the connectors at the upper ends of the vertical tubes of the front wall assembly and the rear wall assembly, and the roof fabric is mounted at upper ends of the support rods.

7. The double-cross cart according to claim 6, further comprising roof sliders disposed around the vertical tubes of the front wall assembly, and the support rods are mounted on the roof sliders.

8. The double-cross cart according to claim 1, wherein the bottom frame assembly comprises two bottom frames and two bottom frame connectors, one sides of the two bottom frames are riveted through the bottom frame connectors, and other sides of the two bottom frames are riveted to the lower end of the front wall assembly and the lower end of the rear wall assembly, respectively;

the double-cross cart further comprises a cart fabric mounted in a frame formed by the front wall assembly, the rear wall assembly, the two side wall assemblies and the bottom frame assembly.

9. A double-cross cart, comprising two side wall assemblies, a front wall assembly, a rear wall assembly, a bottom frame assembly, a draw bar assembly and four wheels, wherein a front end and a rear end of the bottom frame assembly are rotatably connected to a lower end of the front wall assembly and a lower end of the rear wall assembly respectively, the draw bar assembly is rotatably connected to the rear wall assembly, and the four wheels are arranged at the lower end of the front wall assembly and the rear end of the rear wall assembly; each said side wall assembly is a double-cross structure composed of two X-shaped connecting rods that are hinged together, upper sides of front ends and rear ends of the side wall assemblies are riveted to the front wall assembly and the rear wall assembly respectively, and lower sides of the front ends and the rear ends of the side wall assemblies are riveted to the front end and the rear end of the bottom frame assembly respectively; and a lock part is arranged on each of two riveted cross tubes of each of the two X-shaped connecting rods on any one said side wall assembly, and in a folded state, the two lock parts are connected to lock the two cross tubes; wherein the two lock parts are disposed around the two riveted cross tubes of each of the two X-shaped connecting rods, one said lock part is provided with a buckle protrusion, the other lock part is provided with a buckle groove, and in the folded state, the buckle protrusion is embedded in the buckle groove to be locked; wherein the front wall assembly and the rear wall assembly are identical in structure, and the front wall assembly or the rear wall assembly comprises a lower horizontal tube; the draw bar assembly comprises a draw bar, a first connector and a second connector which are riveted in sequence, a rivet angle between the draw bar and the first connector is different from a rivet angle between the first connector and the second connector, and the second connector is mounted on the lower horizontal tube of the rear wall assembly.

10. The double-cross cart according to claim 9, wherein the front wall assembly or the rear wall assembly further comprises an upper U-tube and two vertical tubes, two ends of the upper U-tube are hinged to upper ends of the crossed tubes of the two side wall assemblies and are riveted to upper ends of the two vertical tubes of the front wall assembly or the rear wall assembly, and lower ends of the two vertical tubes are connected to two ends of the lower horizontal tube.

11. The double-cross cart according to claim 10, further comprising a handrail having two ends respectively hinged to the upper ends of the two vertical tubes of the front wall assembly.

12. The double-cross cart according to claim 11, further comprising two short tubes which are respectively mounted at the upper ends of the two vertical tubes of the front wall assembly, and the two ends of the handrail are hinged to upper ends of the two short tubes respectively.

13. The double-cross cart according to claim 10, further comprising a roof fabric and support rods, wherein the support rods are mounted on the connectors at the upper ends of the vertical tubes of the front wall assembly and the rear wall assembly, and the roof fabric is mounted at upper ends of the support rods.

14. The double-cross cart according to claim 13, further comprising roof sliders disposed around the vertical tubes of the front wall assembly, and the support rods are mounted on the roof sliders.

\* \* \* \* \*